(12) United States Patent
Aeppli et al.

(10) Patent No.: US 8,926,773 B2
(45) Date of Patent: Jan. 6, 2015

(54) DRIVE DEVICE FOR A CAROUSEL DOOR

(75) Inventors: Heinz-Peter Aeppli, Wildberg (CH);
Samuel Hedinger, Volketswill (CH)

(73) Assignee: Agtatec AG, Fehraltorf (CH)

( * ) Notice: Subject to any disclaimer, the term of this patent is extended or adjusted under 35 U.S.C. 154(b) by 0 days.

(21) Appl. No.: 14/240,149

(22) PCT Filed: Aug. 22, 2012

(86) PCT No.: PCT/EP2012/003556
§ 371 (c)(1),
(2), (4) Date: Feb. 21, 2014

(87) PCT Pub. No.: WO2013/029763
PCT Pub. Date: Mar. 7, 2013

(65) Prior Publication Data
US 2014/0190286 A1    Jul. 10, 2014

(30) Foreign Application Priority Data

Sep. 1, 2011    (DE) .......................... 10 2011 112 172

(51) Int. Cl.
*F16H 37/04*   (2006.01)
*E05F 15/10*   (2006.01)

(52) U.S. Cl.
CPC ............ *F16H 37/041* (2013.01); *E05F 15/106* (2013.01); *E05Y 2201/434* (2013.01); *E05Y 2400/302* (2013.01); *E05Y 2400/502* (2013.01); *E05Y 2400/532* (2013.01); *E05Y 2800/21* (2013.01); *E05Y 2800/242* (2013.01); *E05Y 2800/244* (2013.01); *E05Y 2800/246* (2013.01)
USPC .................................... 149/42; 49/41; 49/324

(58) Field of Classification Search
USPC ......... 49/40, 41, 42, 324; 109/8, 48, 59 T, 64, 109/73
See application file for complete search history.

(56) References Cited

U.S. PATENT DOCUMENTS

| 3,020,038 | A | * | 2/1962 | Simpson | 49/32 |
| 4,060,935 | A | * | 12/1977 | Miller et al. | 49/25 |
| 4,295,297 | A | * | 10/1981 | Carroll et al. | 49/42 |
| 4,341,165 | A | * | 7/1982 | Calandritti et al. | 109/8 |
| 4,534,131 | A | * | 8/1985 | Blackston et al. | 49/42 |
| 4,581,849 | A | * | 4/1986 | Schwarz | 49/32 |
| 4,800,679 | A | * | 1/1989 | Appelmann | 49/42 |

(Continued)

FOREIGN PATENT DOCUMENTS

| DE | 197 34 399 | 5/1999 |
| DE | 10 2004 060282 | 6/2006 |
| DE | 20 2006 00044 | 2/2007 |
| EP | 1 813 757 | 2/2012 |

OTHER PUBLICATIONS

International Search Report for PCT/EP2012/003556 mailed Oct. 10, 2012.

*Primary Examiner* — Katherine Mitchell
*Assistant Examiner* — Justin Rephann
(74) *Attorney, Agent, or Firm* — Nixon & Vanderhye P.C.

(57) ABSTRACT

The present invention discloses a drive device for a rotor of s carousel door, In addition to a main drive motor (10), which has a main-drive-motor shaft (12), the drive device according to the invention comprises a secondary drive motor (12) with a secondary-drive-motor shaft (22). The main-drive-motor shaft (12) is coupled at least indirectly to the secondary-drive-motor shaft (22, 62) in terms of rotation, and therefore the secondary-drive-motor shaft (22, 62) is coupled to the rotor in terms of movement.

8 Claims, 2 Drawing Sheets

(56) References Cited

U.S. PATENT DOCUMENTS

Figure 1:
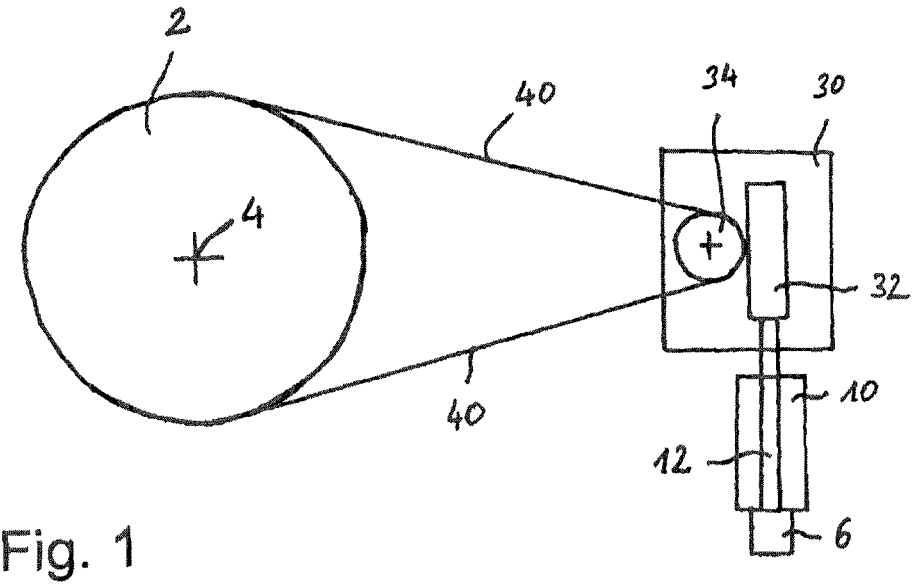

| | | | | |
|---|---|---|---|---|
| 4,872,285 | A * | 10/1989 | Appelmann | 49/42 |
| 5,201,906 | A * | 4/1993 | Schwarz et al. | 109/8 |
| 5,711,111 | A * | 1/1998 | Nyffenegger et al. | 49/42 |
| 5,937,580 | A * | 8/1999 | Backman | 49/43 |
| 6,073,394 | A * | 6/2000 | Uhl | 49/41 |
| 6,370,822 | B1 * | 4/2002 | Otto | 49/42 |
| 6,557,299 | B2 * | 5/2003 | Otto | 49/42 |
| 7,841,133 | B2 * | 11/2010 | Augustyniak et al. | 49/42 |
| 8,171,671 | B2 * | 5/2012 | Gallenschutz | 49/47 |
| 2005/0045078 | A1 * | 3/2005 | Chen | 109/8 |
| 2006/0117662 | A1 * | 6/2006 | Busch | 49/42 |
| 2009/0119996 | A1 * | 5/2009 | Wang | 49/42 |
| 2009/0312873 | A1 * | 12/2009 | Gallenschutz | 700/275 |
| 2012/0090239 | A1 * | 4/2012 | Hondius | 49/27 |

* cited by examiner

DRIVE DEVICE FOR A CAROUSEL DOOR

This application is the U.S. national phase of International Application No. PCT/EP2012/003556 filed 22 Aug. 2012 which designated the U.S. and claims priority to DE 10 2011 112 172.6 filed 1 Sep. 2011, the entire contents of each of which are hereby incorporated by reference.

The present invention relates to a drive device for a rotor of a revolving door, and to a revolving door equipped with this drive device.

Revolving doors are used in particular as imposing, eye-catching solutions for an entryway to a building. Such revolving doors may be installed outside or inside a frontage wall or in the centre of a wall.

A revolving door usually has arcuately curved side walls, between which a rotor centrally revolves. Starting from a central rotor axis, for example two, three or more rotor wings which are offset relative to each other at identical angular distances in the circumferential direction are arranged extending in the radial direction. Revolving doors can be driven by a drive motor which is configured in particular as an electric motor. The drive motor in this case is usually coupled in terms of movement with the rotor of the revolving doors via a gear means configured as a worm gear and a power transmission means configured as a toothed belt.

Furthermore, the control means for starting the revolving door usually comprises proximity sensors which monitor areas in front of the entrance to and exit from the revolving door and detect the approach of a person or an object to the revolving door. In the event of a collision, braking and/or stopping of the revolving door is initiated by signals emitted by collision sensors which monitor the area of coverage of the rotor wings of the revolving door.

If a person or an object is detected by the collision sensors in the area of coverage of the revolving-door wings, the rotor of the revolving door must be braked or completely stopped. The braking can be carried out by the drive motor. Usually additionally a separate braking means is provided which ensures reliable braking of the revolving-door rotor in the event of failure of the drive motor. The braking means may be embodied as an actively electrically actuated solenoid brake, which is also referred to as "second electrical safety path". The drive motor for a corresponding construction of the drive device is the first electrical safety path.

Since the second electrical safety path in the drive devices known from the prior art can be used only for braking the revolving-door rotor, the drive motor has to be designed to be relatively powerful, which results in a high load on the drive train.

An embodiment corresponding to the prior art in this respect is also known inter alia from DE 197 34 499 A1 and from DE 10 2004 060 282 A1. Both prior publications describe a revolving door which is driven by two drive units. A driving belt or a toothed belt is used to ultimately drive the rotor of the revolving door via the motors.

A revolving door comprising two or more door wings which also comprises a drive device comprising two motors is known from DE 20 2006 000 044 U1. An output stage is assigned to each motor.

The object of the present invention is therefore to provide an improved drive device for a rotor of a revolving door which has two electrical safety paths, in which the load on the drive train is reduced, and in which the control is simplified.

The object is achieved according to the invention by a drive device for a rotor of a revolving door and by a corresponding revolving door.

As in the prior art, the drive device according to the invention comprises, in addition to the main drive motor, which has a main-drive-motor shaft, an auxiliary drive motor which comprises an auxiliary-drive-motor shaft. The main-drive-motor shaft in this case is at least indirectly coupled in terms of rotation with the auxiliary-drive-motor shaft, so that the auxiliary-drive-motor shaft is coupled in terms of movement with the rotor.

In said device, the main drive motor forms the first electrical safety path since the revolving-door rotor can be both started and braked by means of the main drive motor. The auxiliary drive motor forms the second electrical safety path, since the revolving-door rotor can be started and braked by means of the auxiliary drive motor. Since the auxiliary-drive-motor shaft is at least indirectly coupled in terms of rotation with the main motor drive shaft, the revolving-door rotor can be jointly driven by the main drive motor and the auxiliary drive motor, so that the load of the drive train is reduced on the motor side. Furthermore, the main drive motor and the auxiliary drive motor may be made with smaller dimensions than an individual drive motor driving a revolving door.

The safety of the drive device is ensured, since braking or stopping of the revolving-door rotor can be effected by the auxiliary drive motor if the main drive motor fails, whereas in the event of failure of the auxiliary drive motor braking or stopping of the revolving-door rotor can be effected by the main drive motor. In this respect, the drive device according to the invention comprises a redundant braking means and a redundant drive means for the revolving-door rotor.

The solution according to the invention is further distinguished by the fact that the drive device also comprises a coupling means, by means of which the main-drive-motor shaft is coupled in terms of rotation with the auxiliary-drive-motor shaft. By means of a corresponding coupling means, rotary coupling of the main-drive-motor shaft with the auxiliary-drive-motor shaft can be achieved in a very simple and inexpensive manner.

In the context of the invention, not only can the load on the drive train be reduced since the driving can, if required, take place for example only via the main drive motor, without the additional mass of the auxiliary drive motor always having to be moved therewith, but an easy-to-service overall design is also provided here, since during servicing, only a defective drive unit can be and needs to be removed and replaced, while the intact drive unit can remain. This would not be possible for a drive means comprising, for example, two motors which share a common motor shaft.

Figure 2:
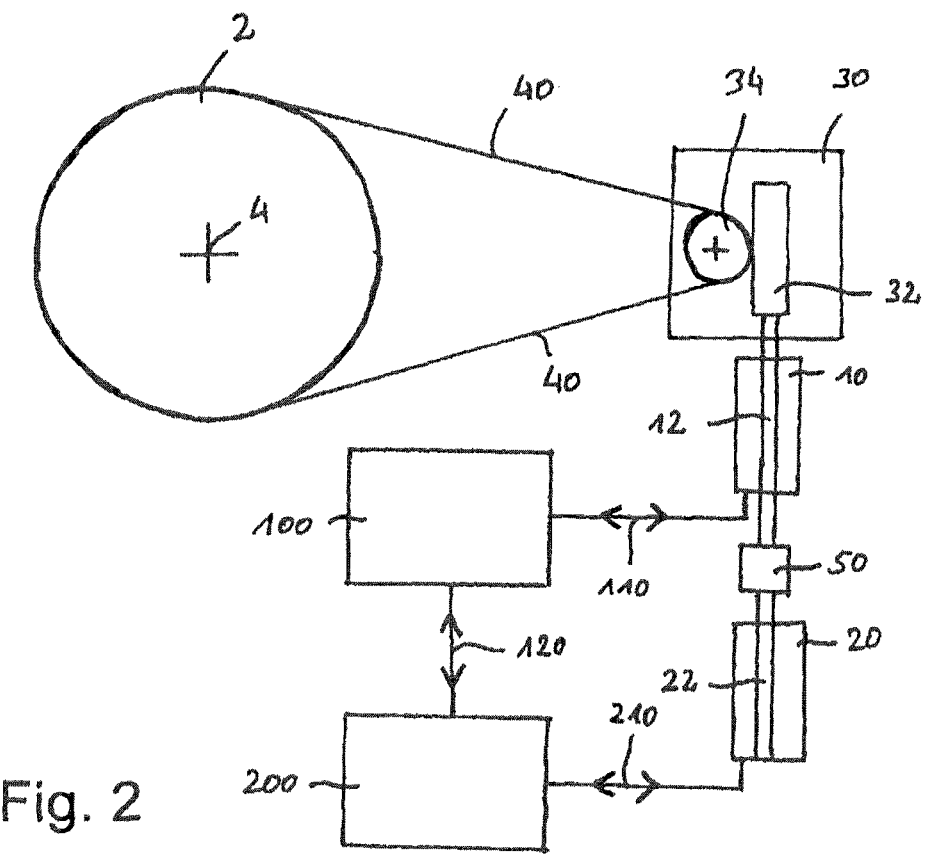
Figure 3:
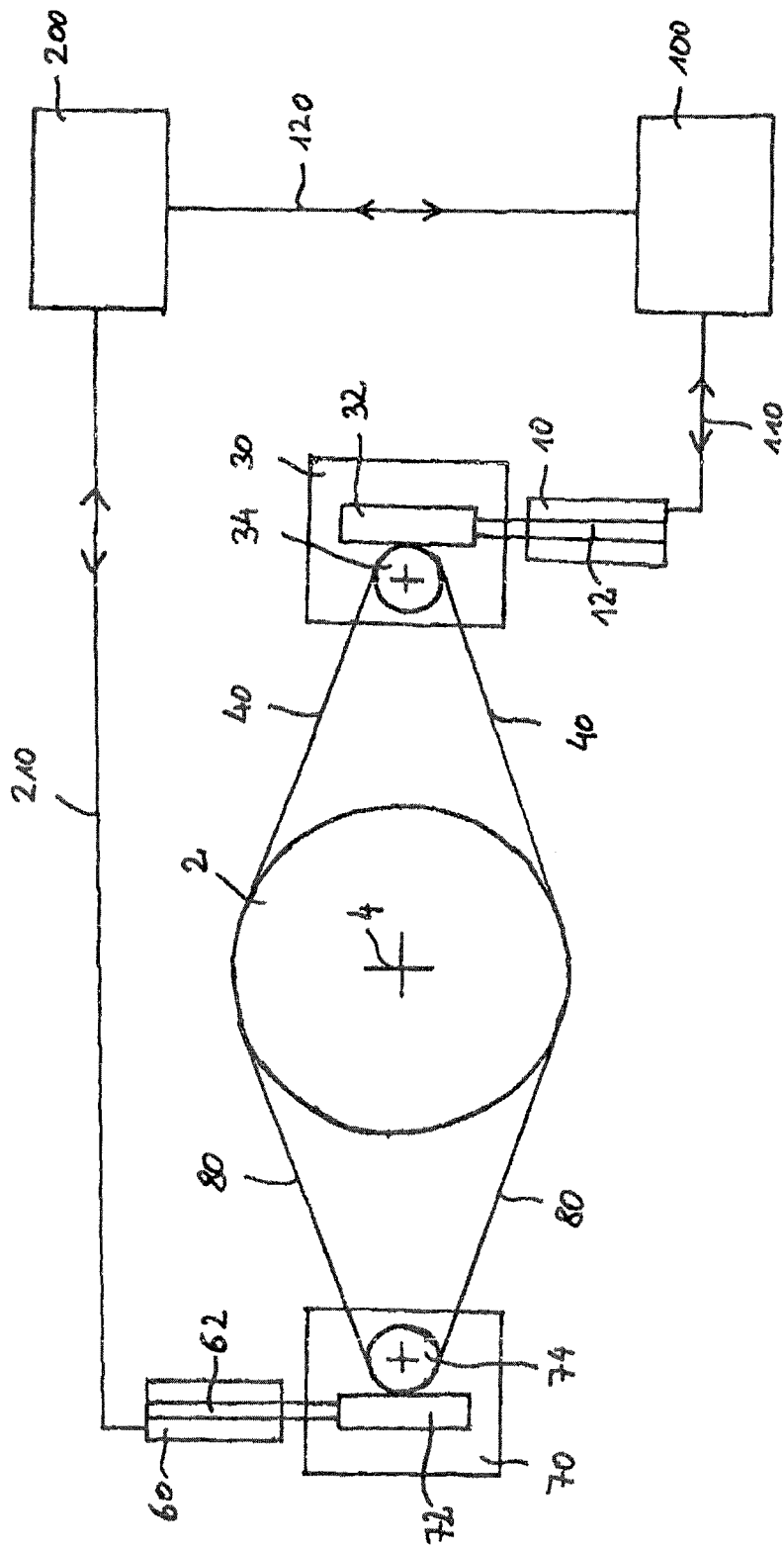

The invention will now be explained further below with reference to examples of embodiment. Therein, the following are shown in detail:

FIG. 1: a diagrammatic representation of a drive device known from the prior art, which is coupled in terms of movement with a revolving-door rotor;

FIG. 2: a diagrammatic representation of a drive device according to the invention which is coupled in terms of movement with a revolving-door rotor; and FIG. 3: a diagrammatic representation of a drive device that is not part of the invention with a modified control means.

In the description which now follows, identical reference numerals designate identical components or identical features, so that a description made in relation to one figure with respect to one component also applies to the other figures, so that repetitive description is avoided.

FIG. 1 shows a diagrammatic representation of a drive device known from the prior art for a rotor of a revolving door. The drive device comprises a drive motor or main drive motor 10 with a main-drive-motor shaft 12 which is coupled in terms of movement with a gear means 30 in the form of a worm gear 30. The main-drive-motor shaft 12 is rotationally connected to a worm shaft 32. The thread (not shown) of the worm shaft 32 meshes with a helically-toothed worm wheel 34, the teeth of the worm wheel 34 not being shown in FIG. 1.

The worm wheel 34 is coupled in terms of movement with a rotor drive 2 in the form of a belt pulley 2 via a power transmission means 40 in the form of a belt 40 or a toothed belt 40. The belt pulley 2 is connected for conjoint rotation to an end face of a rotor (not shown) of a revolving door, the rotor being rotatably mounted about its central axis 4.

Thus the revolving-door rotor is coupled in terms of movement with the main drive motor 10, so that the revolving-door rotor can be both started and braked or stopped by the main drive motor 10.

The drive device illustrated in FIG. 1 further comprises a braking means 6, which may be configured as an actively electrically activated solenoid brake. The braking means 6 is in operative connection with the main-drive-motor shaft 12, so that the braking means 6 is coupled in terms of movement with the revolving-door rotor. In the event of a failure of operation of the main drive motor 10, the braking means 6 serves as a second electrical safety path, and can brake or stop the revolving-door rotor.

FIG. 2 shows a drive device for a revolving-door rotor in accordance with the present invention. The drive device according to the invention differs from the drive device described above in that a braking means 6 as second electrical safety path is dispensed with, and in that the drive device comprises an auxiliary drive motor 20 with an auxiliary-drive-motor shaft 22 and a coupling means 50 by means of which the auxiliary-drive-motor shaft 22 is coupled in terms of rotation with the main-drive-motor shaft 12.

Since the auxiliary-drive-motor shaft 22 is coupled in terms of rotation with the main-drive-motor shaft 12, the auxiliary-drive-motor shaft 22 is coupled in terms of movement with the power transmission means 40 or with the belt 40.

In normal operation, if neither the main drive motor 10 nor the auxiliary drive motor 20 have failed, the revolving-door rotor can be jointly started and/or braked or stopped by the main drive motor 10 and the supplementary drive motor 20. Since the main drive motor 10 and the auxiliary drive motor 20 jointly produce the force or power necessary for starting and/or braking the revolving-door rotor, the load for both the main drive motor 10 and for the auxiliary drive motor 20 is reduced compared with the load of a drive motor of a drive device known from the prior art.

In the event of a failure of operation of the main drive motor 10, if the main drive motor 10 cannot brake or stop the revolving-door rotor, the auxiliary drive motor 20 serves as the second electrical safety path and can brake or stop the revolving-door rotor. Also, the auxiliary drive motor 20 can start or accelerate the revolving-door rotor, so that if there is a complete failure of operation of the main drive motor 10 operation of the revolving door can be maintained.

In the event of a failure of operation of the auxiliary drive motor 20, if the auxiliary drive motor 20 cannot brake or stop the revolving-door rotor, the main drive motor 10 serves as the first electrical safety path and can brake or stop the revolving-door rotor. Also, the main drive motor 10 can start or brake the revolving-door rotor, so that if there is a complete failure of operation of the auxiliary drive motor 20 operation of the revolving door can be maintained. The main drive motor 10 is connected to a main control means 100 via a bidirectional data line 110. The main control means 100 can send command signals to the main drive motor 10 via the data line 110, which signals initiate starting and/or braking of the main drive motor 10. Furthermore, the main drive motor 10 can transmit signals which indicate failure of the main drive motor 10 to the main control means 100 via the data line 110.

The main control means 100, which can also serve as a master control 100, is connected via a bidirectional data line 120 to an auxiliary control means 200, which may also serve as a slave control 200. The auxiliary control means 200 is connected via a bidirectional data line 210 to the auxiliary drive motor 20 in order to transmit command signals for starting and/or braking to said auxiliary drive motor. A failure of the auxiliary drive motor 20 can be transmitted via the data line 210 to the auxiliary control means 200, which transmits this failure signal to the main control means 100 via the data line 120.

The main control means 100 and the auxiliary control means 200 can also be replaced by driver modules which are controlled by a central control means.

In normal operation, if neither the main drive motor 10 nor the auxiliary drive motor 20 have failed, the rotor drive 2 can be jointly driven and/or braked or stopped by the main drive motor 10 and the auxiliary drive motor 20. For this purpose, the main control means 100 emits a corresponding signal to the main drive motor 10 and to the auxiliary control means 200, which in turn emits a signal for starting or braking the auxiliary drive motor 20.

In the case of failure of the main drive motor 10, the main control means 100 does not emit a signal for starting or braking to the main drive motor 10, but a signal to the auxiliary control means 200, so that said auxiliary control means transmits a corresponding signal for starting or braking to the auxiliary drive motor 20. Thus only the auxiliary drive motor 20 drives the rotor drive 2 or brakes it.

In the event of failure of the auxiliary drive motor 20, the main control means 100 emits a signal for starting or braking to the main drive motor 10, but no signal to the auxiliary control means 200, so that only the main drive motor 10 drives or brakes the rotor drive 2.

FIG. 3 shows a further embodiment of the drive device according to the invention. This drive device is constructed similarly to the drive device illustrated in FIG. 2, but further comprises a supplementary worm gear 70 with a supplementary worm shaft 72 and a supplementary worm wheel 74, and a supplementary belt 80, which may be configured as a toothed belt. The auxiliary-drive-motor shaft 62 is coupled in terms of rotation with the main-drive-motor shaft 12 by means of the supplementary worm gear 70, the supplementary belt 80, the toothed belt 40 and the worm gear 30.

The mode of operation of starting or braking the revolving-door rotor by means of the auxiliary drive motor 60, the supplementary worm gear 70 and the supplementary belt 80 corresponds to the mode of operation of starting or braking the revolving-door rotor by means of the main drive motor 10, the worm gear 30 and the belt 40, which mode was described with reference to FIG. 1, so reference is made to the description there.

The revolving-door rotor is coupled in terms of movement via the belt pulley 2 and the belt 40 with the main drive motor 10. At the same time, the revolving-door rotor is coupled in terms of movement with the auxiliary drive motor 60 via the belt pulley 2 and the supplementary belt 80. Thus the drive device illustrated in FIG. 3 is configured redundantly with a first and a second electrical safety path.

The control of the main drive motor 10 and of the auxiliary drive motor 60 by means of the main control means 100 and the auxiliary control means 200 is identical to the control of the main drive motor 10 and the auxiliary drive motor 20 which is described above with reference to FIG. 2, so reference is made to the corresponding sections.

LIST OF REFERENCE NUMERALS 2 rotor drive, belt pulley
4 central axis of the rotor
6 braking means
10 main drive motor
12 main-drive-motor shaft
20, 60 auxiliary drive motor
22, 62 auxiliary-drive-motor shaft
30 gear means, worm gear
32 worm shaft
34 worm wheel
40 power transmission means, belt, toothed belt
50 coupling means
70 supplementary gear means, supplementary worm gear
72 supplementary worm shaft
74 supplementary worm wheel
80 supplementary power transmission means, supplementary belt, supplementary toothed belt
100 main control means
110 data line (between main control means and main drive motor)
120 data line (between main control means and auxiliary control means)
200 auxiliary control means
210 data line (between auxiliary control means and auxiliary drive motor)

The invention claimed is:

1. Drive device for a rotor of a revolving door, comprising:
a main drive motor having a main-drive-motor shaft which is coupled with a power transmission means via a gear means, the power transmission means being designed to drive the rotor,
an auxiliary drive motor having an auxiliary-drive-motor shaft, wherein
the main-drive-motor shaft is coupled with the auxiliary-drive-motor shaft, so that the auxiliary-drive-motor shaft is coupled with the rotor,
a coupling means, wherein
the main-drive-motor shaft is coupled for rotation with the auxiliary-drive-motor shaft by means of the coupling means;
a main control means connected to the main drive motor; and
an auxiliary control means connected to the auxiliary drive motor and to the main control means, wherein the auxiliary control means is designed to receive control signals from the main control means, wherein the main control means comprises a signal input for receiving at least one of (1) a start signal which initiates starting of the revolving door, and (2) a stop signal which initiates braking of the revolving door, wherein upon receipt of a start signal or a stop signal by the main control means, the auxiliary control means controls the auxiliary drive motor such that it is activated for starting or braking the revolving door,
the main control means further comprising a failure signal input for receiving a failure signal of the main drive motor,
the auxiliary control means further comprising a failure signal input for receiving a failure signal of the auxiliary drive motor,
wherein upon receiving the start signal or the stop signal and without receiving the failure signal of the main drive motor and the auxiliary drive motor, the main control means controls the activation of at least one of the main drive motor and the auxiliary drive motor for starting or braking the revolving door,
wherein upon receiving the start signal or the stop signal and receiving the failure signal of the main drive motor, the main control means controls the auxiliary control means such that the auxiliary drive motor is activated for starting or braking the revolving door, and
wherein upon receiving the start signal or the stop signal and upon receiving the failure signal of the auxiliary drive motor, the main control means controls the main drive motor for starting or braking the revolving door.

2. Drive device according to claim 1, wherein:
the gear means comprises a worm gear with a worm shaft and a worm wheel; and
the power transmission means comprises a belt.

3. Drive device according to claim 2, wherein the belt is a toothed belt.

4. Drive device according to claim 1, wherein:
the auxiliary-drive-motor shaft is coupled the main-drive-motor shaft by supplementary gear means;
the supplementary gear means comprises a supplementary worm gear with a supplementary worm shaft, a supplementary worm wheel, and a supplementary power transmission means; and
the supplementary power transmission means comprises a supplementary belt.

5. Drive device according to claim 4, wherein the supplementary belt comprises a supplementary toothed belt.

6. Drive device according to claim 1, wherein at least one of the main drive motor and the auxiliary drive motor comprises an electric motor.

7. Revolving door comprising:
a rotor;
a drive device for the rotor, the drive device comprising:
a main drive motor having a main-drive-motor shaft which is coupled with a power transmission means via a gear means, the power transmission means being designed to drive the rotor,
an auxiliary drive motor having an auxiliary-drive-motor shaft, wherein
the main-drive-motor shaft is coupled with the auxiliary-drive-motor shaft, so that the auxiliary-drive-motor shaft is coupled with the rotor, and
a coupling means, wherein the main-drive-motor shaft is coupled for rotation with the auxiliary-drive-motor shaft by means of the coupling means,
a main control means connected to the main drive motor, and
an auxiliary control means connected to the auxiliary drive motor and to the main control means, wherein the main control means is programmed to concurrently operate the main drive motor and the auxiliary drive motor to drive the rotor, and wherein the main control means is programmed to operate one of the main drive motor and the auxiliary drive motor upon receiving a signal that the other of the main drive motor and the auxiliary drive motor has failed, wherein:
the rotor comprises at least two wings and a rotor drive which comprises a belt pulley;
the rotor rotates about a central axis, and
the rotor drive is coupled with the power transmission means and can be at least one of driven and braked by the drive device.

8. Revolving door according to claim 7, wherein:
the auxiliary-drive-motor shaft is coupled the main-drive-motor shaft by supplementary gear means;
the supplementary gear means comprises a supplementary worm gear with a supplementary worm shaft, a supplementary worm wheel, and a supplementary power transmission means; and
the rotor drive is additionally coupled with the supplementary power transmission means.

* * * * *